(12) United States Patent
Gallup et al.

(10) Patent No.: US 9,743,019 B2
(45) Date of Patent: *Aug. 22, 2017

(54) MULTIPLANE PANORAMAS OF LONG SCENES

(71) Applicant: Google Inc., Mountain View, CA (US)

(72) Inventors: David Robert Gallup, Bothell, WA (US); Steven Maxwell Seitz, Seattle, WA (US); Maneesh Agrawala, Oakland, CA (US); Robert Evan Carroll, Berkeley, CA (US)

(73) Assignee: Google Inc., Mountain View, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 14/807,387

(22) Filed: Jul. 23, 2015

(65) Prior Publication Data

US 2016/0028972 A1    Jan. 28, 2016

Related U.S. Application Data

(63) Continuation of application No. 13/543,543, filed on Jul. 6, 2012, now Pat. No. 9,118,905.

(Continued)

(51) Int. Cl.
*H04N 5/341* (2011.01)
*H04N 13/02* (2006.01)
(Continued)

(52) U.S. Cl.
CPC ......... *H04N 5/3415* (2013.01); *G06T 3/4038* (2013.01); *G06T 15/06* (2013.01);
(Continued)

(58) Field of Classification Search
CPC ............ H04N 5/3415; H04N 13/0282; H04N 5/23238; H04N 5/347; G06T 2207/20221;
(Continued)

(56) References Cited

U.S. PATENT DOCUMENTS 9,118,905 B2 *  8/2015  Gallup .................. G06T 3/4038
2007/0076016 A1  4/2007  Agarwala et al.
(Continued)

*Primary Examiner* — Michelle L Sams
(74) *Attorney, Agent, or Firm* — Lerner, David, Littenberg, Krumholz & Mentlik, LLP

(57) ABSTRACT

Methods, systems, and articles of manufacture for generating a panoramic image of a long scene, are disclosed. These include, fitting a plurality of planes to 3D points associated with input images of portions of the long scene, where one or more respective planes are fitted to each of a ground surface, a dominant surface, and at least one of one or more foreground objects and one or more background objects in the long scene, and where distances from the 3D points to the fitted planes are substantially minimized. These also include, selecting, for respective one or more pixels in the panoramic image of the long scene, one of the input images and one of the fitted planes such that a distance is substantially minimized from the selected one of the fitted planes to a surface corresponding to the respective one or more pixels and occlusion of the respective one or more pixels is reduced in the selected one of the input images; and stitching the panoramic image of the long scene by projecting, for the respective one or more pixels in the panoramic image of the long scene, the selected one of the input images using the selected one of the fitted planes into the virtual camera.

20 Claims, 10 Drawing Sheets

Related U.S. Application Data

(60) Provisional application No. 61/582,109, filed on Dec. 30, 2011.

(51) Int. Cl.
    *G06T 3/40*         (2006.01)
    *H04N 5/232*       (2006.01)
    *G06T 15/06*       (2011.01)
    *H04N 5/347*       (2011.01)

(52) U.S. Cl.
    CPC ......... *H04N 5/23238* (2013.01); *H04N 5/347* (2013.01); *H04N 13/0282* (2013.01); *G06T 2200/04* (2013.01); *G06T 2207/10028* (2013.01); *G06T 2207/20221* (2013.01)

(58) Field of Classification Search
    CPC ......... G06T 2207/10028; G06T 3/4038; G06T 15/06; G06T 2200/04
    See application file for complete search history.

(56) References Cited

U.S. PATENT DOCUMENTS

| | | |
|---|---|---|
| 2009/0179895 A1 | 7/2009 | Zhu et al. |
| 2010/0201682 A1 | 8/2010 | Quan et al. |

\* cited by examiner

MULTIPLANE PANORAMAS OF LONG SCENES

CROSS REFERENCE TO RELATED APPLICATIONS

The present application is a continuation of U.S. patent application Ser. No. 13/543,543, filed on Jul. 6, 2012, which claims priority from U.S. Provisional Application No. 61/582,109, filed on Dec. 30, 2011, the disclosures of which are hereby incorporated herein by reference.

BACKGROUND

Field

This disclosure relates generally to forming panoramic images.

Background

It is often the case that one would like to have an image of a facade of an entire street or length of street that is beyond the field of view of a single camera. However, existing systems for viewing such long scenes can be improved. For example, the current method for browsing street side imagery in Google Streetview is to view a sequence of discrete sets of 360 degree panoramas, or "bubbles". Each bubble is a realistic depiction of what the user would see standing at the location where the images were taken, but it is difficult to get a sense of the overall surroundings using such bubbles. Looking down the street, the view of facades of buildings quickly become severely shortened or otherwise deformed. Several other representations are available for browsing street side images more continuously. These include pushbroom panoramas, multi-perspective panoramas constructed from dense video input or sparse sets of handheld photos, and dynamically constructed view-dependent panoramas constructed from Google Streetview-like inputs. Yet other representations include static street side panoramas that use a single planar proxy and variable width vertical strips which do not account for vertical variation in scene depth.

Therefore, improved methods and systems for panoramic images of long scenes are desired.

SUMMARY OF EMBODIMENTS

Methods, systems, and articles of manufacture for generating a panoramic image of a long scene, are disclosed. These include, accessing input images of portions of the long scene, three dimensional (3D) points associated with the input images, and camera locations associated with the input images; fitting a plurality of planes to the 3D points, wherein one or more respective planes are fitted to each of a ground surface, a dominant surface, and at least one of one or more foreground objects and one or more background objects in the long scene, and wherein distances from the 3D points to the fitted planes are substantially minimized; determining a virtual camera to view the long scene through the camera locations; selecting, for respective one or more pixels in the panoramic image of the long scene, one of the input images and one of the fitted planes such that a distance is substantially minimized from the selected one of the fitted planes to a surface corresponding to the respective one or more pixels and occlusion of the respective one or more pixels is reduced in the selected one of the input images; and stitching the panoramic image of the long scene by projecting, for the respective one or more pixels in the panoramic image of the long scene, the selected one of the input images using the selected one of the fitted planes into the virtual camera.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

The present disclosure is generally directed to forming panoramic images of long scenes. A "long scene", as used herein, can include a facade such as a street side, long grocery store isle, beach front, river front, or similar scene. Typically, the length of a long scene makes it difficult for it to be captured in a single image. Embodiments disclosed herein, form panoramic images of long scenes using images of portions of the long scene.

Figure 1A:
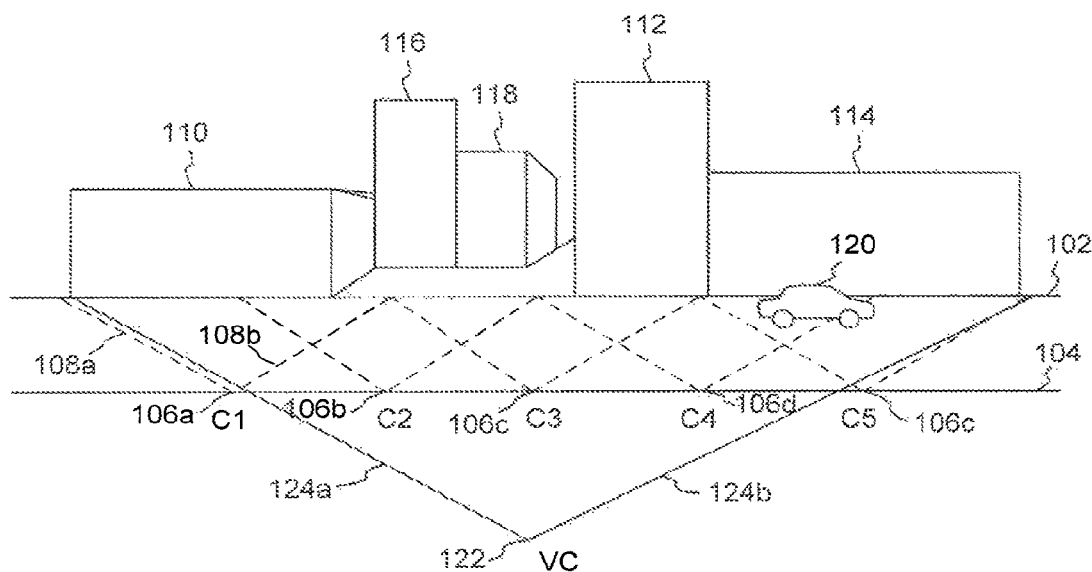
FIG. 1A illustrates an exemplary sketch of a long scene of a street side and corresponding positions of camera locations and a virtual camera in accordance with an embodiment.

FIG. 1A illustrates an exemplary sketch 100 of a long scene of a street side and corresponding positions of camera locations and a virtual camera, in accordance with an embodiment. The exemplary long scene 100 includes buildings 110-118, a car 120 in the foreground, and may include the street in front of the buildings. Buildings 110, 112, and 114 may be located at or near the street line 102 and forms the dominant surface (sometimes also referred to as the "dominant facade") of the long scene. Buildings 116 and 118 are positioned further back from street line 102, and can be considered background objects in the long scene. Car 120 is located in front of the streetline 102 and can be considered a foreground object in the long scene.

A camera may be moved along a path 104 down the street capturing images of the street side. Camera locations C1 (106a), C2 (106b), C3(106c), C4 (106d), and C5 (106e), illustrate positions of a camera corresponding to several images of portions of the long scene. C1, for example, may capture a portion of the long scene in its field of view defined by viewing rays 108a and 108b. The images captured by one or more cameras, at camera locations C1-C5 may be panoramic or non-panoramic images.

In embodiments, a virtual camera VC 122 is defined, such that its field of view defined by viewing rays 124a and 124b includes the length of the long scene. Virtual camera 122 is positioned so that it appears to view street side 102 through cameras C1-C5. As VC 122 gets further away from C1-C5, VC 122 field of view increases, and as VC 122 gets closer to C1-C5 the field of view narrows.

In contrast to conventional approaches, embodiments use multiple planes to project the dominant surfaces, background surfaces, foreground surfaces, and ground surface into the virtual camera to generate the panoramic image of the long scene.

Figure 1B:
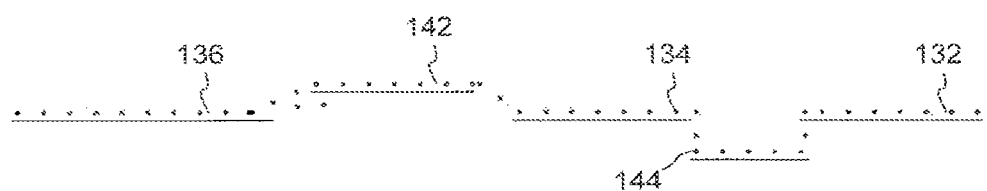
FIG. 1B illustrates an exemplary sketch of three dimensional points of the scene depicted in FIG. 1A and planes fitted to the points in accordance with an embodiment.

FIG. 1B illustrates an exemplary sketch 130 of three dimensional points representative of the scene depicted in FIG. 1A and planes fitted to the points in accordance with an embodiment. 3D points corresponding to the street side illustrated in FIG. 1A can be measured by using a method such as LIDAR at the time of image capture time. Alternatively, the 3D points can be determined from the images using a method such as stereo. FIG. 1B illustrates the 3D points corresponding to the surfaces of FIG. 1A, viewed as a horizontal cross-section. Three-dimensional point clusters 136, 134, and 132 correspond respectively to buildings 110, 112, and 114 that form the dominant surface of the illustrated long scene. Three-dimensional point cluster 142 represents background buildings 116 and 118, and 3D point cluster 144 represents car 120 in the foreground. As shown in the simplified illustration, planes can be fitted to each cluster.

Embodiments fit multiple planes to clusters of 3D points such that a best fit plane for each cluster is found. The illustrated horizontal cross section shows depth differences of the street side objects taken at the level of the cross section. However, it is also possible that the same object has vertical differences in depth. Embodiments, by fitting multiple planes to respective surfaces to determine a best fit, yield an improved quality projection of images.

Figure 2A:
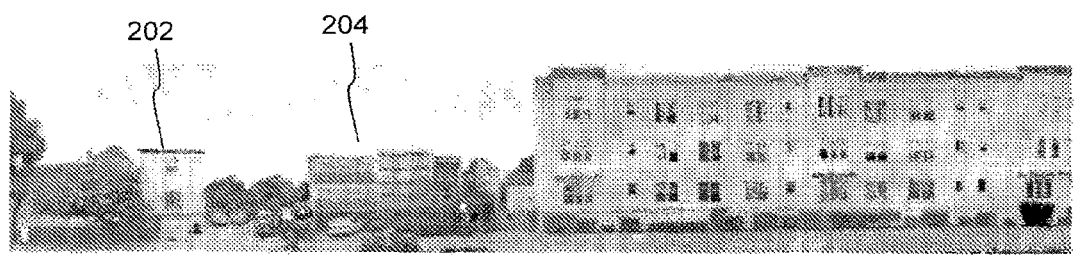
FIG. 2A illustrates an exemplary street facade rendered using a single plane.
Figure 2B:
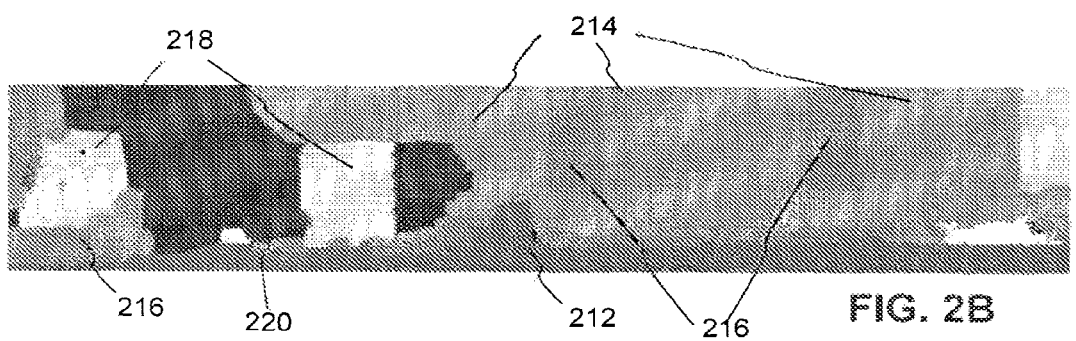
FIG. 2B illustrates fitted planes corresponding to the street facade shown in FIG. 2A, in accordance with an embodiment.
Figure 2C:
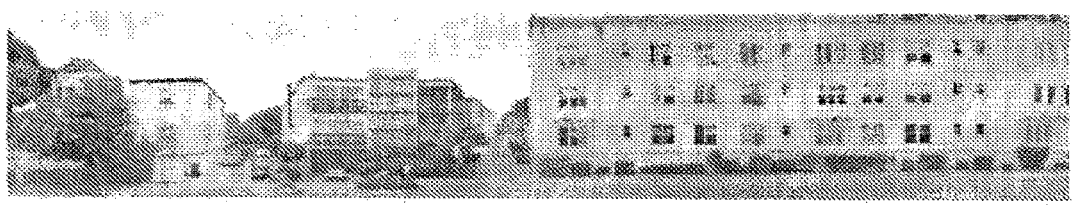
FIG. 2C illustrates a multiplane panoramic view of the long scene street side shown in FIG. 2A, in accordance with an embodiment.

FIGS. 2A-2C illustrate some differences in panoramic images of long scenes produced using embodiments. FIG. 2A illustrates an exemplary street facade rendered using a single plane. Some repeated elements and deletions can be noticed in the left 202 and middle 204 buildings. FIG. 2C illustrates a multiplane panoramic view of the long scene street side shown in FIG. 2A, in accordance with an embodiment. The repeated elements and truncations visible in FIG. 2A is not present in FIG. 2C. FIG. 2B illustrates planes corresponding to the street facade shown in FIG. 2A, in accordance with an embodiment. The areas, depicted in shades of gray, represent projection planes. Reference numeral 212 indicates the ground plane, reference numeral 214 indicates the dominant facade, reference numeral 216 indicates a plane fit mostly to protrusions from the facade on the right building and the shrubbery, and reference numerals 218 and 220 correspond to planes fit to buildings on the left of the image.

Figure 3A:
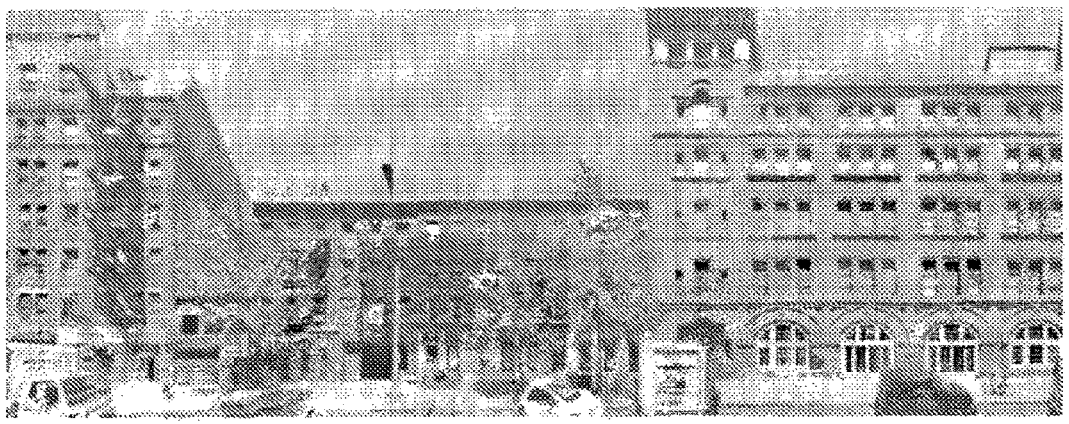
FIGS. 3A and 3B illustrate, respectively, an exemplary single plane rendering of a street side, and a corresponding multiplane rendering of the same street side in accordance with an embodiment.
Figure 3B:
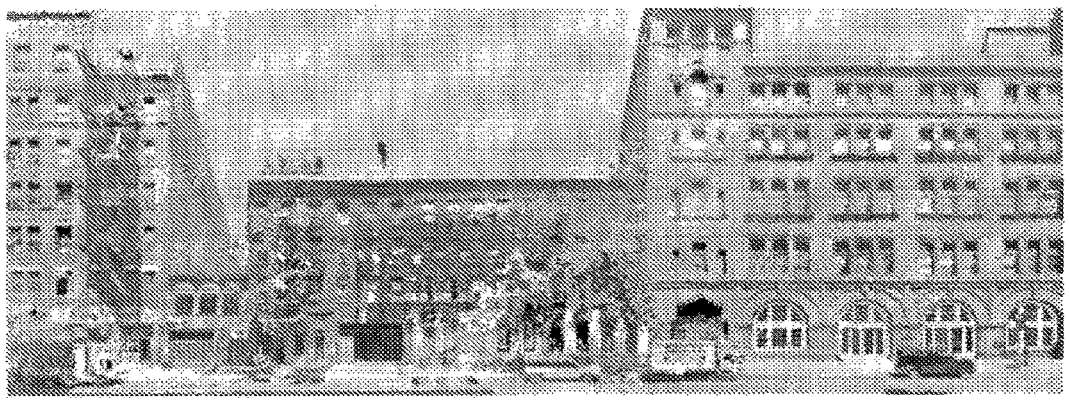

FIGS. 3A and 3B illustrate respectively, an exemplary single plane rendering of a street side, and a corresponding multiplane rendering of the same street side in accordance with an embodiment. Using multiple planes can alleviate some of the deletion and repetition artifacts seen in the single planes results. FIGS. 3A and 3B show a comparison between using a single plane and multiple planes for the illustrated street side. The view in FIG. 3A is made with a single plane fit to the dominant facade. The view in FIG. 3B is made with planes fit to the facade, the ground plane, and 2 planes fit to foreground objects. Since the multiplane image uses planes for the foreground objects, they do not get compressed or cut in half. Also, the ground plane looks more natural, consistent with viewing it from a single perspective. In the single plane result the ground plane is stretched vertically, making it look artificially wide.

Figure 4:
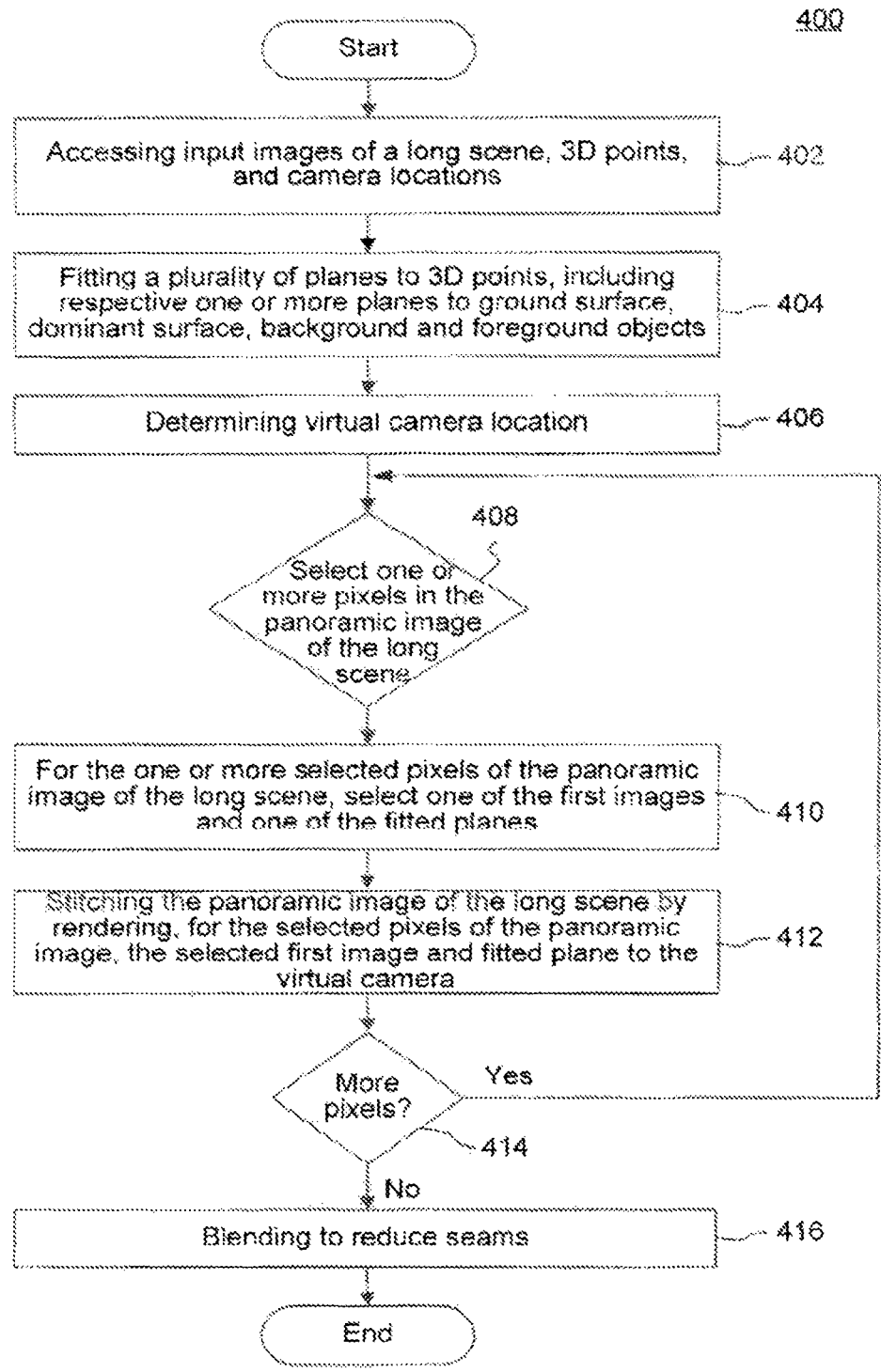
FIG. 4 illustrates a flowchart 400 of a method to generate panoramic images of long scenes, in accordance with an embodiment.

FIG. 4 illustrates a flowchart 400 of a method to generate panoramic images of long scenes, in accordance with an embodiment.

At step 402, input images are accessed. Each of the input images may include a view of a portion of a long scene. For example, each input image may include a portion of a view of a street side facade. The input images may be panoramic images. For example, input images may be 360 degree panoramic images used for Google Streetview. According to another embodiment, the input images may be non-panoramic.

Three-dimensional point information associated with the input images may be another input to generate panoramic images of a long scene. The 3D points may be obtained at the same time as the input images are captured. A laser scan technique, such as LIDAR, may be used to obtain the 3D points. Three-dimensional points may also be determined from respective images using a technique such as stereo. Each 3D point, in effect, indicates the location in 3D of a point on a surface. The 3D location includes the depth from the camera or other viewpoint. The 3D points may be referred to as a 3D point cloud. FIG. 1B above illustrates a horizontal cross-section view of a 3D point cloud corresponding to the street side facade shown in FIG. 1A.

Camera information associated with the input images may also be an input to the process for generating panoramic images of a long scene. The camera information includes camera locations at which each of the input images were captured. According to an embodiment, for respective input images, a single camera location representing the actual capture position for that image may be available. According to another embodiment, the camera location may be determined using the start position and end position of a capture. For example, panoramic Streetview input images may have a start position and end position for the rolling shutter camera as it moves down the street, and the capture location may be approximated as the mid-point between the start and end positions.

At step 404, a plurality of planes are fitted to the 3D point cloud. According to an embodiment, planes may be fitted to the point cloud using a technique, such as, a mean shift approach and an update rule. The approach generates random initial guesses which are then optimized with mean shift to minimize the distance of each 3D point to the plane. Fitting planes to the 3D point cloud is further described below in relation to FIG. 5.

At step 406, a location is determined for the virtual camera. According to an embodiment, the virtual camera may be positioned behind the capture camera locations looking in the direction of the long scene. In the example street side facade, the virtual camera may be considered as being located further away from the street than the capture cameras. As the virtual camera is moved further away a longer facade of the street side is viewable. The positioning of the virtual camera is further described below in relation to FIG. 6.

Steps 408-414 may be repeated to process all pixels, or a determined portion of the pixels, of the panoramic image of the long scene. According to an embodiment, steps 408-414 are repeated for each pixel of the panoramic image of the long scene. For example, pixels from the top left corner of the image to the bottom right may be selected in sequence in a left to right and top to bottom manner. According to another embodiment, contiguous areas of pixels may be selected in the image for each iteration of steps 408-414. For example, groups of contiguous pixels having the same fitted plane may be selected for each iteration. Other techniques of selecting pixels for processing steps 408-414, such as, for example, selecting blocks of pixels are contemplated within embodiments. For purposes of discussion of the following steps, and not by way of limitation, it is assumed that, for each iteration of steps 408-414, one pixel is selected (at step 408) in the left to right and top to bottom manner.

At step 410, a pairing of an input image and a fitted plane is chosen for the selected pixel of the panoramic image. According to an embodiment, each input image is projected into the virtual camera using one or more planes that are associated with the input image. For example, a projection into the virtual camera may be made for each plane that is fitted in the point cloud in a surface viewable in the input image. Each projection of an input image and fitted plane into the virtual camera produces a candidate image, which may then be used to select the best pairing of an input image and a fitted plane for the pixel. Choosing of the pairing of an input image and a fitted plane for the pixel is further described below in relation to FIG. 7.

At step 412, the panoramic image of the long scene is stitched using the projection into the virtual camera of the pairing of an input image and a fitted plane for the selected pixel. The projections for all of the pixels are stitched to form the long scene panoramic image.

At step 414, it is determined whether more pixels are to be processed, and if so method 400 proceeds to step 408 to select the next pixel. Otherwise, method 400 proceeds to step 416. At step 416, blending of areas in the stitched image may be performed. Blending can, for example, reduce the visible seams at the edges of the portions of each input image that is projected to the final panoramic image of the long scene.

Figure 5:
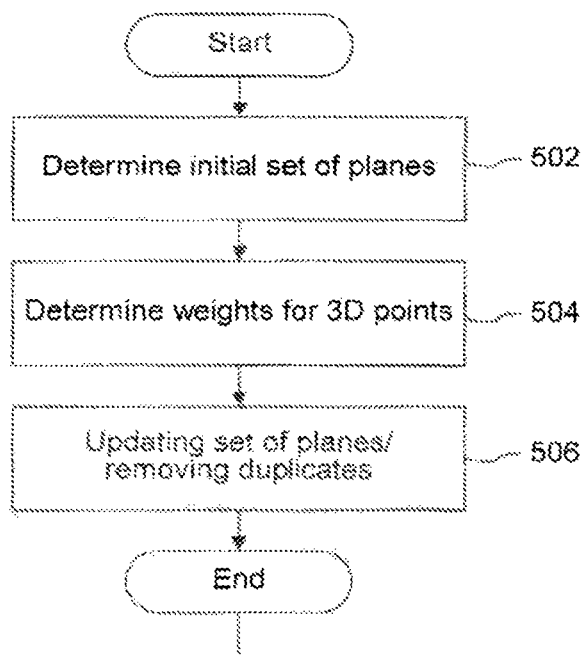
FIG. 5 illustrates a method 500 for fitting planes to the 3D point cloud, in accordance with an embodiment.

FIG. 5 illustrates a method 500 for fitting planes to the 3D point cloud, in accordance with an embodiment. Method 500 may be used, for example, in performing step 404 discussed above. Method 500 is used to find a set of planes that substantially optimally fits the 3D point cloud. As an illustrative example, for the long scene illustrated in FIG. 1A, method 500 may result in one or more closely fitting planes respectively for each of the dominant facade, the background buildings and the foreground objects.

According to an embodiment, method 500 operates to find a set of planes by starting with an initial set of planes from RANSAC ("RANdom SAmple Consensus"), and then using a mode seeking procedure to remove redundant RANSAC plane estimates. That is, initial planes are fitted to the 3D points using RANSAC, the planes are updated with the mode seeking procedure until convergence, and then any inliers are removed. This procedure is iterated until the desired number of unique planes is found. The entire 3D point cloud is used for mode seeking at each iteration; points are only removed for iterations of the RANSAC estimates.

At step 502, an initial set of planes is determined. According to an embodiment, an initial set of planes may be determined based on a technique such as RANSAC. All of the 3D points or portions of the 3D points may be selected as points based upon which an initial set of planes is determined to fit those selected points. For example, based upon RANSAC, the 3D points or the selected portions of those points may be considered as inliers, i.e., points that correspond to the desired model (for example, the surface of a street side), and the initial set of planes may be determined based upon a least squares approximation of the initial set to the 3D points considered as initial inliers.

At step 504, weights for 3D points are determined for each plane. The weights may be based upon the distance from the point to the respective plane. According to an embodiment, the weights decay exponentially as the distance between a point and a corresponding plane increases.

At step 506, the set of planes is updated. According to an embodiment, the updating may include a mode seeking step loosely based upon the mean shift technique. Mean shift is a clustering algorithm that finds modes (local maxima) of a kernel density estimator. Given an initialization x of a cluster center and a kernel function, x is updated to the mean of the surrounding points weighted by the kernel function. Different initializations can converge to different modes, and all points that converge to the same mode are clustered together. Using an approach similar to mean shift, planes may be found by starting with an initial estimate, calculating weights for the point cloud based on the distance to the plane, and updating the plane with a weighted least squares fit minimizing the orthogonal distances of the points to the plane. Minimizing the orthogonal distances may include reducing the distances towards a minimum, and does not necessarily require obtaining the minimum values. The set of planes may be updated with weighted least squares fit minimizing the orthogonal distances of the 3D points to the respective planes. According to an embodiment, the update may be performed according to (1) below.

$$\theta_{t+1} = \arg\max_\theta \Sigma_i \exp[-\beta \text{Dist}^2(\theta_t, x_i)] \text{Dist}(\theta, x_i) \quad (1)$$

Where $\theta$ are the plane parameters, $x_i$ are points from the point cloud, and Dist gives the point to plane distance. $\beta$ is a parameter controlling the width of the weighting function, and is related to the standard deviation of a Gaussian distribution, i.e. $\beta = \sigma^{-2}$.

The update of the set of planes with the mode seeking procedure may be repeated until convergence of the set of planes. Any inliers, as determined by the updated set, can then be removed.

After the update step, it is determined whether further iterations of steps 502-506 are required. If more iterations are required, processing of method 500 proceeds to step 502 with the point cloud updated to remove inlier points and duplicate surfaces. The determination may be based upon whether the desired number of unique planes fitting the 3D point cloud has been found. The desired number of planes may be configured as an upper threshold of planes to be found. The determination may also be based upon characteristics of the remaining 3D points which have not yet been removed from the point cloud considered for the RANSAC step. For example, not having any areas with a distribution density of the 3D points above a configured threshold may be considered as an indication of the lack of additional significant surface areas to be fitted with planes.

Figure 6:
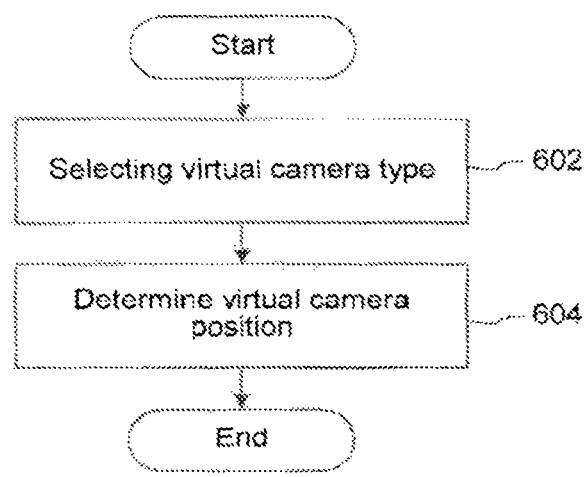
FIG. 6 illustrates a flowchart of a method 600 to determine the virtual camera to be used to generate panoramic images of long scenes.

FIG. 6 illustrates a flowchart of a method 600 to determine the virtual camera to be used to generate panoramic images of long scenes. Method 600 may, for example, be used in performing step 406 of method 400 discussed above.

At step 602, the type of camera to be used as the virtual camera is selected. The panoramic image of the long scene is produced by projecting each input image into a new view, or virtual view, using a virtual camera. Any camera model may be used as the virtual camera. According to an embodiment, a standard perspective camera, with view direction parallel to the ground plane is used. A view direction that is parallel to the ground ensures vertical lines stay vertical.

At step 604, the location of the virtual camera is determined. The virtual camera may be positioned by moving back from the center of the input camera's path (from the first input image to the last input image) in a direction perpendicular to the input camera's path and at approximately a 10 degree angle with the ground plane. This procedure generally moves the camera away from the street side, allowing the capture of more of the street facade in a single view. The viewing direction of the virtual camera may be back towards the input path center, but parallel to the ground plane. The distance that the virtual camera is pulled back determines the width of the field of view of the final panoramic image. If the distance between viewpoints of first and last input images is D, and the virtual camera is moved a distance d parallel to the ground plane, a horizontal field of view of 2 arctan(D/2d) may be obtained. If d=D/2, the field of view may be approximately 53 degrees. If d=D an approximately 90 degree field of view may be obtained.

Figure 7:
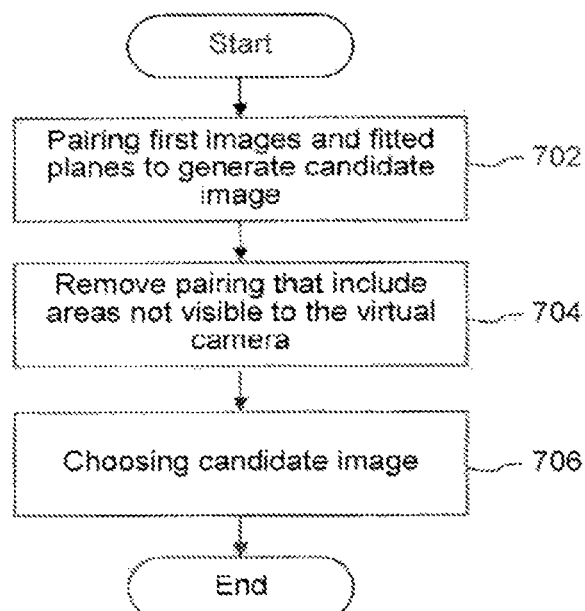
FIG. 7 illustrates a flowchart for a method 700 for selecting input images to be rendered for respective pixels or groups of pixels of the panoramic image of the long scene.

FIG. 7 illustrates a flowchart for a method 700 for selecting input images to be rendered for respective pixels or groups of pixels of the panoramic image of the long scene. Method 700 can be used, for example, in performing step 410 discussed above. Each input image or input panorama can be rendered into the virtual camera using any of the planes fitted to the 3D point cloud, producing a candidate image. These images are good candidates where the plane is close the true surface (e.g., surface of the street facade) and the input image views that surface without occlusion. From the candidate images, for each pixel in the virtual image, the best input image/fitted plane pair. A function to be optimized can measure how parallel the virtual camera's viewing ray is to the viewing ray of the input image.

At step 702, the input images and fitted planes are paired to generate candidate images. With the viewing position and direction of the virtual view defined, as described in relation to FIG. 6 above, the horizontal and vertical fields of view of the camera can be determined. Each 3D point can be projected into the virtual view to determine the minimum and maximum image coordinates in the vertical and horizontal directions. For each input image/fitted plane pair, a view is rendered from the virtual camera by projecting rays onto the plane and back into the input image.

At step 704, pairings that include input images having areas that are not visible to the virtual camera are discarded. The candidate images from step 702 above may be inaccurate when the input image includes areas that are occluded to the virtual camera. Therefore, such input images may be removed from consideration. The 3D point cloud can be used to determine the input images that include surfaces or areas that are occluded from the virtual camera. For example, in FIG. 1A, the virtual camera may not view some areas of building surfaces in the dominant facade due the car in the foreground. However, those areas occluded from the virtual camera may still be visible to one or more input cameras because of the differences in viewing rays, and fields of view.

At step 706, the candidate image for rendering the pixel or group of pixels in the panoramic image of the long scene is chosen. According to an embodiment, the selection of the candidate image is based upon a graph cut based Markov Random Field (MRF) approach.

The data term of the MRF may be selected to measure the distance between rays from the virtual camera and the center of projection of the input cameras. This data term encourages using input images that are likely to see the scene geometry from close to the same viewing direction as the virtual camera. In instances where, such as in Streetview panoramic images, there is no fixed center of projection (due to, for example, a rolling shutter), the center of the input camera positions for the input image can be approximated as its center of projection. The cost of assigning a camera c with center of projection $p_c$, to a ray $x+tv$ is represented by (2).

$$C(p_c, x, v) = |p_c - (x + <p_c - x, v>v)| \tag{2}$$

Only rays which project into an input image are valid, otherwise the cost is infinite or very high in practice. The total data cost can be represented as in (3).

$$E_{data}(l) = \Sigma_{pixels\ i} C(P_{l(i)}, x_i, v_i) \tag{3}$$

where $(x_i, v_i)$ is the ray associated with pixel i and l is an assignment of cameras/plane pairs to pixels, i.e. l(i) is the index of the camera/plane pair assigned to pixel i. Changing the viewpoint of the virtual camera may change the data costs, resulting in view-dependent rendering effects. This is in contrast to data terms which uses two dimensional image distances, and encourages using views directly in front of the plane along its normal direction.

A smoothness term is used to encourage seamless transitions between pixels from different input images. The smoothness cost for neighboring pixels is shown in (4).

$$V(i, l(i), j, l(j)) = |I_{l(i)}(i) - I_{l(j)}(i)|_1 - |I_{l(i)}(j) - I_{l(j)}(j)|_1 \tag{4}$$

If l(i) and l(j) correspond to the same plane. If l(i) and l(j) correspond to the different planes the smoothness cost is shown in (5).

$$V(i, l(i), j, l(j)) = c \frac{|I_{l(i)}(i) - I_{l(j)}(i)|_1 - |I_{l(i)}(j) - I_{l(j)}(j)|_1}{1 + |I_{l(i)}(i) - I_{l(j)}(i)|_1 - |I_{l(i)}(j) - I_{l(j)}(j)|_1} \tag{5}$$

The denominator in the above equation measures how strong of an edge is between the neighboring pixels in both images, encouraging cuts along strong edges when transitioning between planes. The motivation for this term is to encourage transition between planes at depth discontinuities, where there are likely edges in the image. The constant c may be set to a value such as 100 in order to prevent the cost of switching planes from being much cheaper than staying on the same plane. The total smoothness cost may be represented as in (6).

$$E_{smoothness} = \Sigma_i \Sigma_{\Omega(i)} V(i,l(i),\Omega(i),l(\Omega(i))) \quad (6)$$

where $\Omega(i)$ is the set of all neighbors of i assuming the pixels are 4-connected.

The total energy to be minimized may be a sum of the data and smoothness terms, and may be represented as in (7). Minimizing the total energy includes reducing the energy towards a minimum, and may not necessarily include reducing to the minimum value.

$$E_{smoothness} = E_{data} + \alpha E_{smoothness} \quad (7)$$

The constant $\alpha$ may be configured according to the proportion of the effect of the data and smoothness terms. According to an embodiment, $\alpha=1$ may be used when rendering images 2000-3000 pixels wide, and when 3D distances are measured in meters.

Moreover, the camera or input image assignment MRF may be further optimized using techniques such as alpha-expansion techniques. Exemplary alpha-expansion techniques are described in Y. Boykov, O. Veksler, and R. Zabih. "Fast approximate energy minimization via graph cuts," IEEE Trans. Pattern Anal. Mach. Intell., 23:1222-1239, November 2001. The alpha-expansion with support for sparse data terms can be used to obtain a performance boost when each label is only feasible for a small portion of pixels. This condition occurs, for example, when rays from the virtual camera do not project into a particular input image.

The above described process of selecting candidate images can be optionally further optimized by adding selected constraints. In particular the point cloud may be used to add constraints such that if it is known which planes are accurate in a certain area, then only those planes are used. Also, if it is known that a texture (portion of input image) is valid for a particular plane, then that texture shouldn't be used for any other planes.

Since the 3D scans, input images, and virtual view are all taken from different viewpoints, it is unclear which 3D points are actually visible from each camera (input and virtual). One can estimate which points are occluded by constructing a 3D mesh from the laser scan point cloud. The 3D laser scans vertical lines perpendicular to the direction of the Streetview camera, resulting in columns of scan points with regular spacing. The scan points are a regular grid, so scan point m of the scan line n is fairly close to scan-point (m+1, n) as well as (m, n+1), except for at depth discontinuities. We make a triangle out of points (m, n), (m+1, n), (m, n+1) and points (m+1, n+1), (m+1, n), (m, n+1) for all m and n. This mesh can be used for occlusion testing from any camera location.

Depth agreement constraints may also be added based on whether laser points (i.e., 3D points) agree with each of the planes. If a laser point projects into the virtual camera unoccluded (by the mesh described above, for example) and it is close to any of the planes, then only planes which are close to that point are valid planes for the pixel where that point projects in the virtual view. All other planes are marked as infeasible for the corresponding pixel. This constraint forces objects that are only close to certain planes to use those planes.

Additional occlusion constraints may be included to prevent images from being used to texture occluded geometry. First, for each input camera, plane, and 3D point, one may check if the point is close to the plane and unoccluded to the camera. If so, then it is known that the input image provides a valid texture for the plane, but for any planes that are not close to the point the texture is invalid. Therefore, one may project the input image point back onto all the other planes and into the virtual camera image. The input camera can be marked as infeasible for all the corresponding pixels in the virtual view.

The above constraints yield a set of infeasible camera/plane labels. The depth agreement constraint marks a set of labels with the same geometry as invalid for each pixel, and the occlusion constraint marks particular camera/label pairs as invalid. These constraints can be encoded by assigning the labels very high weights in the MRF, or by removing them as candidate labels for those pixels during the optimization of the MRF.

Figure 8:
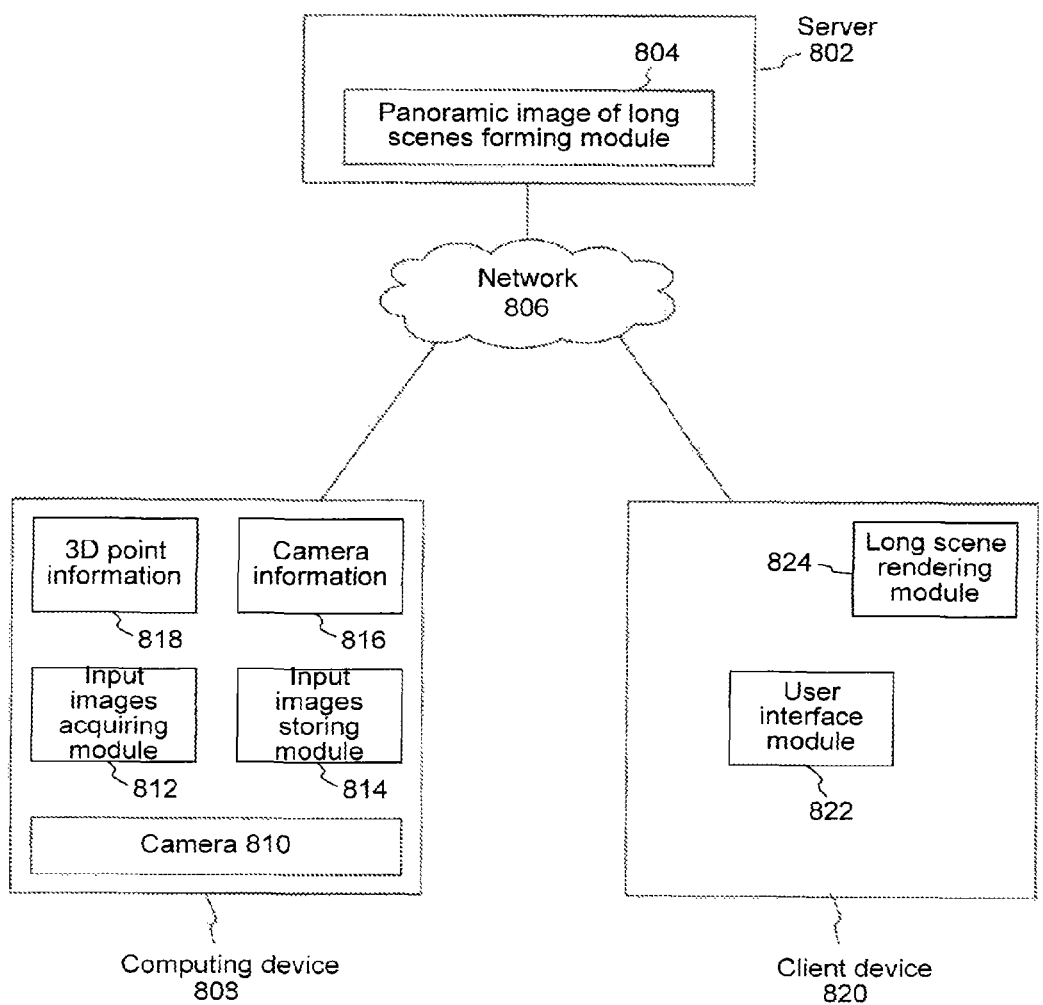
FIG. 8 illustrates an example network system 800 for rendering panoramic images of long scenes from input images of portions of the long scene according to an embodiment.

FIG. 8 illustrates an example network system 800 for rendering panoramic images of long scenes from input images of portions of the long scene according to an embodiment. Network system 800 includes server 802. Server 802 includes a long scene panoramic image forming module 804. Long scene panoramic image forming module 804 includes logic to generate panoramic long scenes from input images of portions of the scene, in accordance with an embodiment. According to an embodiment, logic for method 400 may be included in long scene panoramic image forming module 804.

Server 802 may be communicatively coupled to a computing device 808 and client device 820 through a network 806. Network 806 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi, 3G, or 4G) network components.

Server 802, computing device 808 and client device 820 can be implemented on any computing device capable of processing images. Devices 802, 808 and 820 may include, for example, a mobile computing device (e.g. a mobile phone, a smart phone, a personal digital assistant (PDA), a navigation device, a tablet, or other mobile computing devices). Devices 802, 808 and 820 may also include, but are not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display.

Computing device 808 includes logic to acquire panoramic or other images of portions of the long scene. Computing device 808 includes a camera 810, an input image acquiring module 812, and input image storing module 814, a camera information module 816, and a 3D point information module 818.

Camera 810 may include any digital image capture device such as, for example, a digital camera or an image scanner. While camera 810 is included in computing device 808, camera 810 is not intended to limit the embodiments in any way. Alternative methods may be used to acquire photographic images such as, for example, retrieving photographic images from a local or networked storage device.

Input image acquiring module 812 includes logic to acquire input images through an attached camera or through other means. As noted earlier, input images may be panoramic or non-panoramic. Input image storing module 814 includes logic to store input images and associated information such as the 3D point cloud information and camera information associated with the input images. Camera information module 816 includes logic to determine camera locations or information associated with the camera locations for each of the input images. 3D point information module 818 includes logic to determine 3D point cloud information associated with each of the input images.

Client device 820 includes a user interface module 822 and a long scene rendering module 824. User interface module 822 may include input and output devices including keyboard, display, a browser, and the like that enable user interaction with client device 820. Long scene rendering module 824 includes logic to render a long scene on client device 822 based upon information communicated from server 802. According to an embodiment, long scene rendering module 824 renders a long scene on a browser on client device 822, where the panoramic image of the long scene is retrieved from server 802 or from another location (not shown) where the long scene generated by server 802 is stored.

Figure 9:
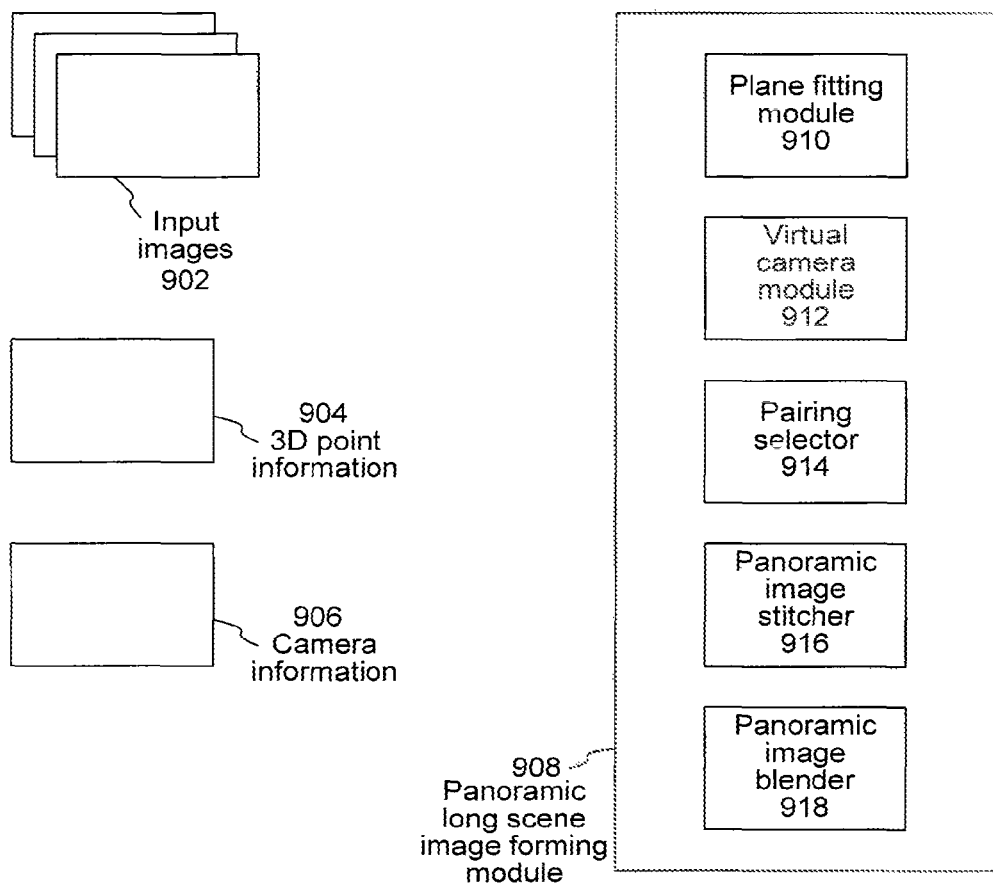
FIG. 9 illustrates a system for long scene panoramic image generation in accordance with an embodiment of the present invention.

FIG. 9 illustrates a system 900 for long scene panoramic image generation in accordance with an embodiment of the present invention. System 900 includes panoramic long scene image forming module 908 which may be configured to implement method 400. According to an embodiment, long scene panoramic image generation module 908 includes a plane fitting module 910, a virtual camera module 912, a pairing selector module 914, a panoramic image stitcher module 916, and a panoramic image blender module 918. Plane fitting module 910 includes logic to fit planes into the 3D point cloud. According to an embodiment, plane fitting module 910 can be configured to implement method 500. Virtual camera module 912 may include logic to determine an appropriate camera type, and to position the virtual camera. According to an embodiment, virtual camera module 912 can implement functions described in relation to method 600. Pairing selector 914 includes logic to select candidate images for pixels or groups of pixels. According to an embodiment, pairing selector 914 can implement method 700. Panoramic image stitcher 916 includes logic to stitch the panoramic long scene from the projections of the different input images. Panoramic image blender 918 includes logic to blend the panoramic long scene, for example, in order to reduce visibility of seams between portions of the image projected from different input images.

System 900 may also include input images 902, 3D point information 904, and camera information 906. Input images 902 may include panoramic or non-panoramic images of portions of the long scene to be rendered. 3D point information 904 includes the point information corresponding to the input images. Camera information 906 includes information, such as the capture positions, capture start position, and capture end positions, and/or moving speed information for the camera, for the respective input images.

Figure 10:
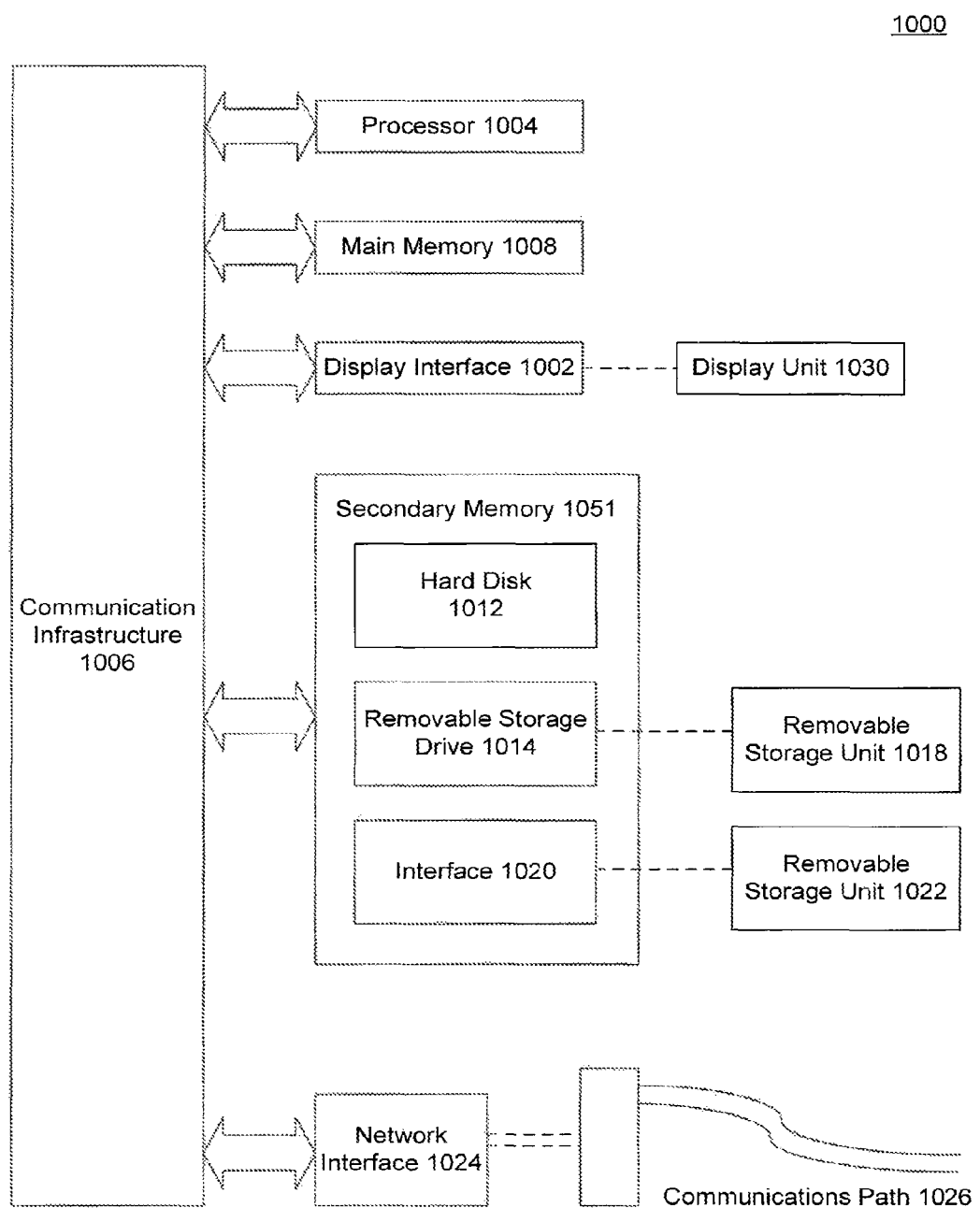
FIG. 10 illustrates an example computer in which the embodiments described herein, or portions thereof, may be implemented.

FIG. 10 illustrates an example computer 1000 in which the embodiments described herein, or portions thereof, may be implemented as computer-readable code. For example, long scene panoramic image forming module 908 or any of its modules can be executed on one or more computer systems 1000 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 1004 may be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme. Computer system 1000 may also include display interface 1002 and display unit 1030.

Computer system 1000 also includes a main memory 1008, for example, random access memory (RAM), and may also include a secondary memory 1010. Secondary memory 1010 may include, for example, a hard disk drive 1012, and removable storage drive 1014. Removable storage drive 1014 may include a floppy disk drive, a magnetic tape drive, an optical disk drive, a flash memory drive, or the like. The removable storage drive 1014 reads from and/or writes to a removable storage unit 1018 in a well-known manner. Removable storage unit 1018 may include a floppy disk, magnetic tape, optical disk, flash memory drive, etc. which is read by and written to by removable storage drive 1014. As will be appreciated by persons skilled in the relevant art, removable storage unit 1018 includes a computer readable storage medium having stored thereon computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 1018, removable storage unit 1022, and a hard disk installed in hard disk drive 1012. Computer storage medium and computer readable storage medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement the embodiments described herein. In particular, the computer programs, when executed, enable processor device 1004 to implement the processes of the embodiments, such as the stages in the methods illustrated by flowcharts of FIGS. 4-7, described above. Accordingly, such computer programs represent controllers of computer system 1000. Where an embodiment is implemented using software, the software may be stored in a computer storage medium and loaded into computer system 1000 using removable storage drive 1014, interface 1020, and hard disk drive 1012, or communications interface 1024.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for generating a stitched image, comprising:
    accessing, by one or more computing devices, input images of portions of a scene, three dimensional (3D) points associated with the input images, and camera locations associated with the input images;
    fitting, by the one or more computing devices, a plurality of planes to the 3D points, wherein one or more respective planes are fitted to at least one of one or more foreground objects and one or more background objects in the scene, and wherein distances from the 3D points to the fitted planes are substantially minimized;
    determining, by the one or more computing devices, a virtual camera to view the scene through the camera locations;
    selecting, by the one or more computing devices, for respective one or more pixels of a stitched image, one of the input images and one of the fitted planes such that a distance is substantially minimized from the selected one of the fitted planes to a surface corresponding to the respective one or more pixels; and
    generating, by the one or more computing devices, the stitched image based on the selected one of the fitted planes.

2. The method of claim 1, wherein fitting the plurality of planes to the 3D points comprises:
    determining, by the one or more computing devices, a set of planes to fit the 3D points; and
    updating, by the one or more computing devices, the set of planes to substantially minimize orthogonal distances from the set of planes to the 3D points.

3. The method of claim 2, wherein updating the set of planes comprises:
    determining, by the one or more computing devices, one or more weights for a particular one of the 3D points, wherein each of the one or more weights is based on a distance from the particular one of the 3D points to a plane in the set of planes; and
    refining, by the one or more computing devices, the set of planes using a weighted least squares of the determined one or more weights substantially minimizing at least one orthogonal distance from the particular one of the 3D points to the set of planes.

4. The method of claim 3, wherein refining the set of planes includes removing duplicate planes from the set of planes.

5. The method of claim 2, wherein the 3D points include a 3D point cloud of the scene.

6. The method of claim 1, further comprising:
    blending, by the one or more computing devices, to reduce appearance of seams in the stitched image.

7. The method of claim 1, wherein determining a virtual camera comprises:
    positioning the virtual camera, wherein the positioning includes closely matching viewing rays of the virtual camera and the camera locations associated with the input images.

8. The method of claim 1, wherein determining a virtual camera comprises:
positioning the virtual camera, wherein the virtual camera is a perspective camera at ground level.

9. The method of claim 1, wherein selecting one of the input images and one of the fitted planes comprises:
pairing ones of the input images and ones of the fitted planes to generate candidate images;
removing, from the candidate images, pairings of the input images and the fitted planes that include surfaces not visible to the virtual camera; and
choosing ones of the candidate images, wherein the choosing includes having substantially parallel viewing rays from the virtual camera and from one or more of the camera locations to the corresponding input image.

10. The method of claim 9, wherein choosing ones of the candidate images further includes a preference against different ones of the pairings for neighboring pixels in the stitched image.

11. The method of claim 1, wherein the input images are panoramic images.

12. A system for generating a stitched image of a scene, comprising:
a memory for storing input images; and
one or more processors configured to access data from the memory and configured to:
access input images of portions of a scene, three dimensional (3D) points associated with the input images, and camera locations associated with the input images;
fit a plurality of planes to the 3D points, wherein one or more respective planes are fitted to at least one of one or more foreground objects and one or more background objects in the scene, and wherein distances from the 3D points to the fitted planes are substantially minimized;
determine a virtual camera to view the scene through the camera locations;
select, for respective one or more pixels of a stitched image, one of the input images and one of the fitted planes such that a distance is substantially minimized from the selected one of the fitted planes to a surface corresponding to the respective one or more pixels; and
generate the stitched image based on the selected one of the fitted planes.

13. The system of claim 12, wherein fitting the plurality of planes to the 3D points comprises:
determining a set of planes to fit the 3D points; and
updating the set of planes to substantially minimize orthogonal distances from the set of planes to the 3D points.

14. The system of claim 13, wherein updating the set of planes comprises:
determining one or more weights for a particular one of the 3D points, wherein each of the one or more weights is based on a distance from the particular one of the 3D points to a plane in the set of planes; and
refining the set of planes using a weighted least squares of the determined one or more weights substantially minimizing at least one orthogonal distance from the particular one of the 3D points to the set of planes.

15. The system of claim 14, wherein refining the set of planes includes removing duplicate planes from the set of planes.

16. The system of claim 12, wherein the one or more processors are further configured to:
blend to reduce appearance of seams in the stitched image.

17. The system of claim 12, wherein determining a virtual camera comprises:
positioning the virtual camera, wherein the positioning includes closely matching viewing rays of the virtual camera and the camera locations associated with the input images.

18. The system of claim 12, wherein determining a virtual camera comprises:
positioning the virtual camera, wherein the virtual camera is a perspective camera at ground level.

19. The system of claim 12, wherein selecting one of the input images and one of the fitted planes comprises:
pairing ones of the input images and ones of the fitted planes to generate candidate images;
removing, from the candidate images, pairings of the input images and the fitted planes that include surfaces not visible to the virtual camera; and
choosing ones of the candidate images, wherein the choosing includes having substantially parallel viewing rays from the virtual camera and from one or more of the camera locations to the corresponding input image.

20. The system of claim 19, wherein choosing ones of the candidate images further includes a preference against different ones of the pairings for neighboring pixels in the stitched image.

* * * * *